Figure 1:
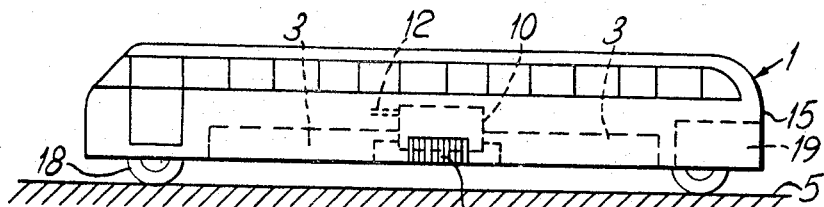

INVENTORS
W. B. HART
A. J. BING.
R. B. STROUDE
BY Cameron, Kerkam & Sutton
ATTORNEYS May 7, 1968  W. B. HART ET AL  3,381,627

VEHICLES

Filed July 19, 1966  3 Sheets-Sheet 2

INVENTORS
W. B. HART
A. J. BING
R. B. STROUDE

BY Cameron, Kerkam & Sutton
ATTORNEYS

May 7, 1968   W. B. HART ETAL   3,381,627
VEHICLES

Filed July 19, 1966   3 Sheets-Sheet 3

INVENTORS
W. B. HART
A. J. BING
R. B. STROUDE
BY
Cameron, Kerkam & Sutton
ATTORNEYS United States Patent Office 3,381,627
Patented May 7, 1968

3,381,627
VEHICLES
William Barrie Hart, Dibden, Purlieu, Alan John Bing, Lyndhurst, and Roger Boulton Stroude, Egham, England, assignors to Hovercraft Development Limited, London, England, a British company
Filed July 19, 1966, Ser. No. 566,273
Claims priority, application Great Britain, July 22, 1965, 31,231/65
10 Claims. (Cl. 104—23)

This invention relates to vehicles and is concerned with vehicles which obtain at least occasional support from a pressurised gas cushion, the cushion being formed and contained beneath the vehicle body.

One such vehicle is adapted for operation either on a tracked or roadway surface. For track operation the vehicle is supported by a gas-cushion formed and contained beneath the vehicle body and for operation on the roadway the vehicle is supported by roadwheels. The roadwheels are retractable and are retracted when the vehicle is on the track.

However, the equipment necessary for retracting the roadwheels occupies a fairly large volume of space within the vehicle body which would be advantageous to use for other purposes, for example, cargo and/or passengers.

According to the invention, a vehicle which obtains at least occasional support from the cushion of pressurised gas is provided with a chamber having a movable wall part which faces the surface, the wall part being flexibly connected to the remainder of the chamber so as to be movable towards and away from the surface, gas supply means for supplying pressurised gas to the chamber interior, cushion-forming means for directing gas from the chamber to between the wall part and the surface so as to form said cushion of gas therebetween and resilient means for biasing the wall part away from the surface against the loading of gas in the chamber.

The invention is also applicable to vehicles which are intended for permanent operation on a prepared track which defines a support surface and a pair of oppositely-facing guide surfaces. One such track is of rectangular cross-section and another has a channel-like cross-section. In the former form of track the guide surfaces are the outwardly-facing sides of the track and in the latter they are the inwardly-facing upright surfaces.

It has been found that such a vehicle can be given a good measure of lateral stability by means including a pair of gas cushions formed in contact with the track guide surfaces and if the vehicle is provided with control means for maintaining a differential between the respective forces exerted by the vehicle-supporting gas cushion and the vehicle stabilising gas cushions on the support and guide surfaces. Hence, this arrangement forms another feature of the invention.

The cushion forming means may include a gas discharge port for directing a flow of gas from the chamber and towards the surface in the form of at least one curtain of moving gas. Alternatively, the cushion forming means may include a gas transfer port connecting the interior of the chamber with the space occupied by the cushion and flexible wall means extending around and depending from at least part of the periphery of the wall part.

Figure 2:
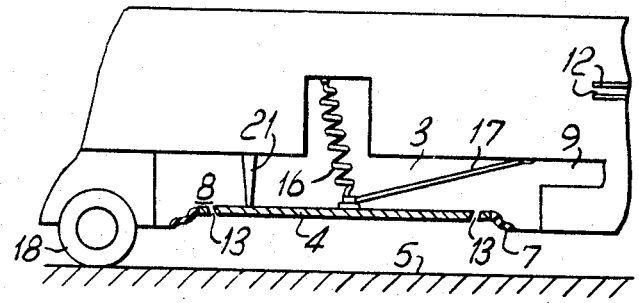
Figure 3:
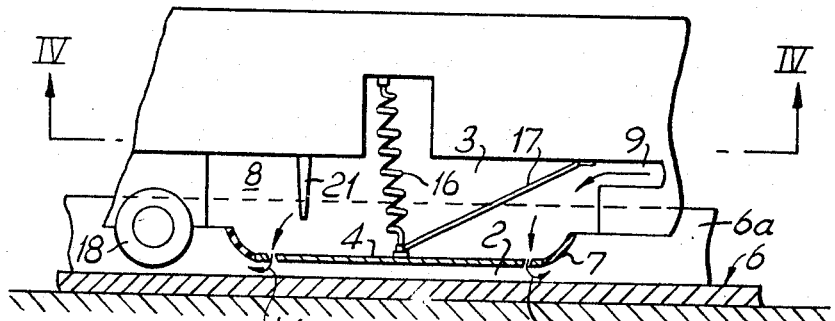
Figure 4:
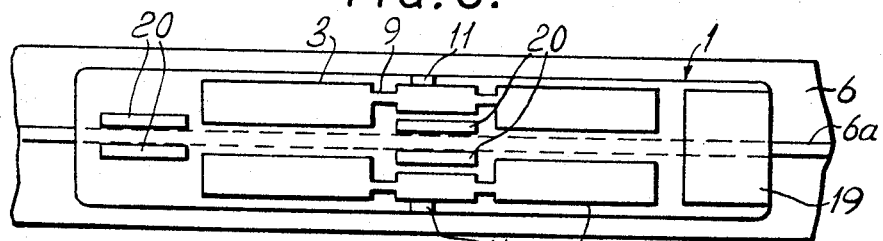
Figure 5:
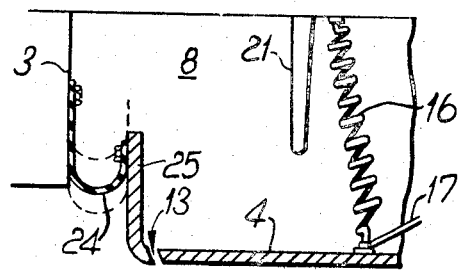
Figure 6:
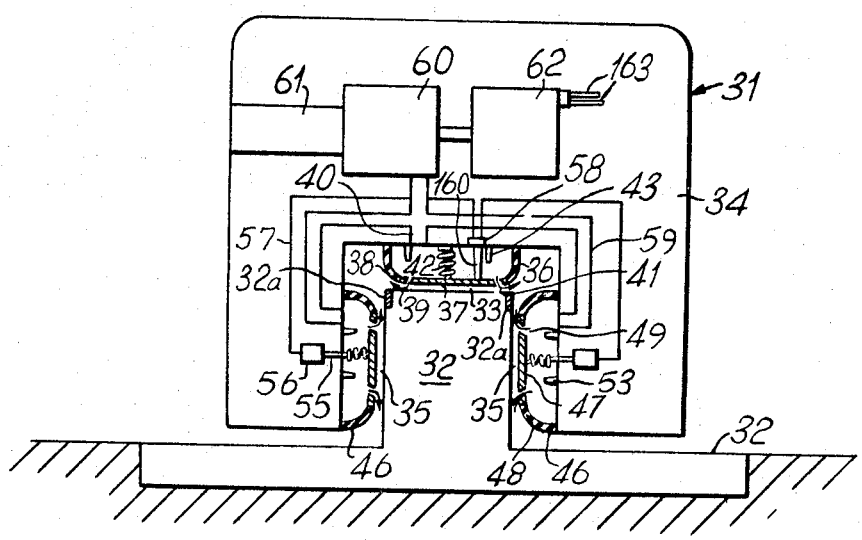
Figure 7:
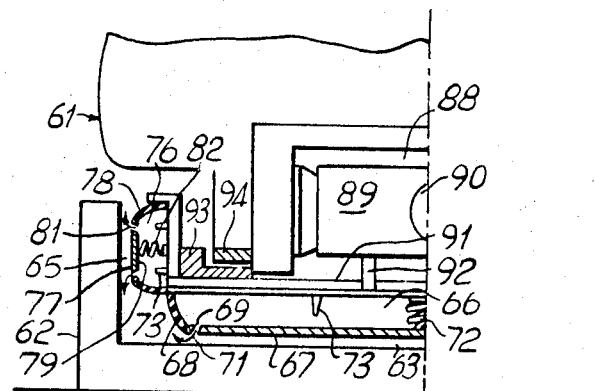
Figure 8:
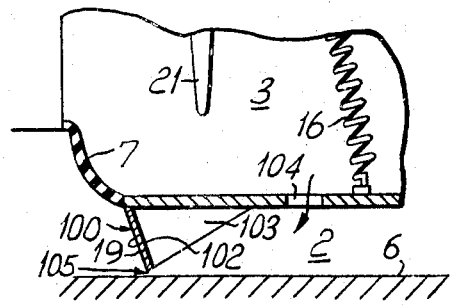
Figure 9:
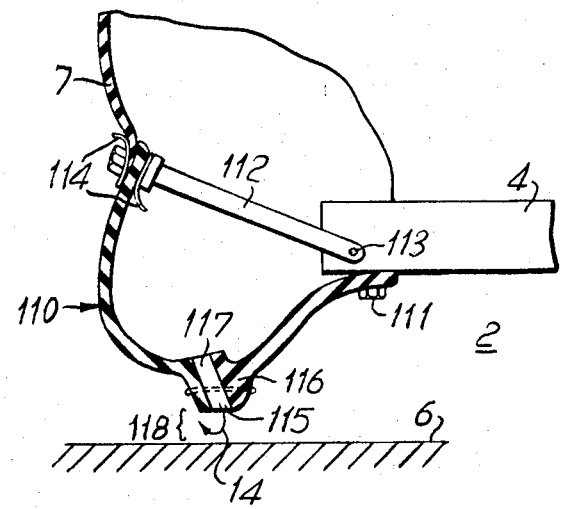

Embodiments of the invention will now be described by way of example, with reference to the accompanying drawings wherein:

FIGURE 1 is a side view of a vehicle,

FIGURES 2 and 3 are fragmentary details, to an enlarged scale, of a part of FIGURE 1, FIGURE 4 is a plan view in section of the vehicle of FIGURE 1 taken on the lines IV—IV of FIGURE 3, FIGURE 5 is a fragmentary detail illustrating a modification of parts shown in FIGURES 2 and 3, FIGURE 6 is an end view, in section, of a further vehicle, FIGURE 7 is a half end view, in section, of yet a further vehicle, and FIGURES 8 and 9 are fragmentary details illustrating further modifications of the vehicle of FIGURE 1.

With reference to FIGURES 1 to 4, a vehicle 1 which obtains occasional support from a cushion 2 (FIGURE 3) of pressurised air is provided with four internal chambers 3 disposed in tandem pairs with a space between each pair. The chambers each have cushion forming means which include a bottom wall part 4 in the form of a panel disposed so that its bottom face is presented towards the surface over which the vehicle operates. FIGURES 1 and 2 show the vehicle 1 operating on a roadway surface 5 and FIGURES 3 and 4 show the vehicle operating on a surface in the form of a track 6 of inverted T section, the upright portion of the section comprising a rail 6a serving as the linear motor "rotor."

The wall part 4 of the chamber 3 is connected to the remainder of the chamber by a flexible membrane 7 of rubberised material so as to be movable relative thereto, towards and away from the surfaces 5 or 6 and pressurised air is fed to the interiors 8 of the chambers 3 in a controlled manner, through ducts 9 connected to an air compressor 10. The compressor 10 draws in atmospheric air through side intakes 11. The output of the compressor 10, which is driven by an electric motor (not shown), is controlled by the driver of the vehicle through electrical signal lines 12 whereby the wall part 4 is moved towards and away from a surface 5 or 6 according to air pressure changes within the chambers 3 and against the resilient loading of a tension spring 16 as explained hereinafter.

The wall part 4 of each chamber 3 is penetrated by a peripherally-disposed, inwardly-inclined gas discharge slot or port 13 which causes part of the air present in the chamber to discharge through the port 13 in the form of a curtain 14 of moving air which initially forms, and thereafter contains, the air cushion 2. Hence, the port 13 forms part of the cushion-forming means. Each wall part 4 is biased away from the surface 5 and against the downward loading of air in the chamber 3 by the tension spring 16 and is constrained to a substantially vertical movement by radius locating rods 17 which pivot about their upper ends. A downwardly-projecting, rod-like stop 21 limits upward movement of the wall 4. The downward-loading of air in the chamber 3 is balanced by the upward-loading of the cushion 2, plus the upward bias of the spring 16. The vehicle is provided with non-retractable pairs of roadwheels 18, the rear pair of which is driven, when on the road surface 5, by an engine, clutch and gearbox unit 19. For operation on the track 6, the vehicle is provided with pairs of linear motor stator units 20 (FIGURE 4 only) which cooperate with the linear motor rail 6a in the manner described in, for example, the article by E. R. Laithwaite entitled, "Prospects for Linear Induction Motors," appearing in the journal New Scientist (No. 255), Oct. 5, 1961, pages 42 to 45.

With particular reference to FIGURES 1 and 2, when operating on the surface of the roadway 5, the vehicle 1 is supported by the wheels 18 and is then propelled by driving the rear wheels through the engine unit 19. Under these conditions the air compressor 10 is either at rest or under a very small load and the wall parts 4 of the chambers 3 are maintained well clear of the roadway by the springs 16.

With reference now to FIGURES 3 and 4, to operate on the track 6, the vehicle 1 is driven up to one end of the track and positioned so that the pairs of linear motor units 20 straddle the rail 6a. The compressor 10 is started up (or, if already started, put under increased load) until the chambers 3 are filled with air at sufficient pressure to overcome the loading of the springs 16 and move the wall parts 4 towards the track 6. Simultaneously, air discharges from chamber 4 through the air supply ports 13 and towards the surface 5 to initially form and thereafter contain the air cushions 2 in the well-known manner. As the cushions 2 form, the vehicle is lifted up until the roadwheels 18 are clear of the track 6 and the vehicle is wholly supported by the cushions. The change from wheel to cushion support can be made without stopping the vehicle but, before the roadwheels 18 are lifted clear of the track 6, the linear motor windings 20 should be brought into operation. Once the vehicle 1 is wholly supported by the cushions 2 and propelled by the linear motors the engine unit 19 can be stopped.

When supported by the air cushions 2, the air-filled chambers 3 serve as pneumatic springs which absorb transient loads arising from vertical movement of the vehicle 1 as it negotiates slight but inevitable undulations of the track 6. The tension springs 16 serve, under these conditions, to combine with the air-filled chambers 3 in providing a suspension system having a "rate" which provides a comfortable "ride" whereby the wall parts 4 "follow" track undulations but the vehicle body travels in substantially straight line.

The invention provides a retractable air cushion support unit of simple construction as, when the cushions 2 are formed, the wall parts 4 of the chambers 3 are subjected to a small pressure differential only. Typically, for a cushion pressure of 200 p.s.f. and a chamber pressure of 250 p.s.f. the pressure differential applied to a wall part 4 is 50 p.s.f. Hence, a wall part 4 can be of light-weight construction and its low weight allows rapid deflection so that it "follows" track undulations to a high degree.

When leaving the track 6 for the roadway 5, the compressor 10 is shut down or put on a very low load whereupon the springs 16 act to retract the wall parts 4 towards the vehicle body.

With reference now to FIGURE 5, a wall part 4 of a chamber 3 can be flexibly connected to the remainder of the associated chamber 3 by a "rolling" diaphragm 24. This modification requires, however, that the periphery of the wall part 4 be provided with an upstanding flange portion 25. The "rolling" diaphragm 24 has inherently less overall "stiffness" than the membrane 7 of the embodiment of FIGURES 1 to 4, having substantially no "stiffness" over the middle part of its travel (full lines of FIGURE 5) but with a positive stiffness towards the extremities of movement (dotted lines of FIGURE 5).

FIGURE 6 illustrates an embodiment of the invention wherein a vehicle obtains continuous support from a cushion of pressurised air. With reference to the figure a vehicle in the form of a railcar 31 operates on a track 32 of rectangular section and is supported thereon by a series of (one only being shown) air cushions 33 disposed in tandem along the fore-to-aft axis of the railcar body 34. The railcar 31 is stabilised laterally by pairs of air cushions 35 (one pair only being shown) also arranged in tandem along lines substantially parallel to said fore-to-aft axis, one air cushion 35 of a pair being disposed on one of the oppositely-facing (in an outward sense) of the side faces of the track 32 and the other of the pair on the opposite side face thereof.

Each air cushion 33 is formed beneath a chamber 36 having a bottom wall part 37 presented towards the top face of the track 32 and connected to the remainder of the chamber 36 by a flexible diaphragm 38. The wall part 37 is penetrated by a peripherally-disposed inwardly-inclined slot or port 39 and pressurised air fed to the interior of the chamber 36 by way of a duct 40 discharges from the port 39 to initially form, and thereafter contain, by means of an air curtain 41, the cushion 33. The wall part 37 is resiliently biased away from the track 32 and against the downward loading of air in the chamber 36 by a tension spring 42. The springs 42 combine with the air-filled chambers 36 (which serve as pneumatic springs) to provide a suspension system having a "rate" which provides a comfortable "ride" whereby the wall parts 37 "follow" track undulations but the vehicle body travels in a substantially straight line. Downwardly projecting, rod-like stops 43 limit upward movement of the wall 37.

Each air cushion 35 is formed between the side faces of the track 32 and "side" wall parts 47 of chambers 46 which have components 47 to 51 and 53 identical to components 37 to 41 and 43 respectively. Resilient means in the form of tension springs 54 are disposed between the inner faces of the "side" walls 47 and mushroom-headed spindles 55 rotatable by reversible electric motors 56 and bias the wall parts 47 away from the track 32 against the lateral loading of the air-filled chambers 46. The springs 54 and chambers 46 also combine to provide a stabilising system whereby lateral movements of the wall parts 47 are "damped" out in a manner similar to the suspension system referred to above. The motors 56 are controlled by electrical signals transmitted along signal lines 57 by a pressure sensitive controller 58 having a pressure-sensing probe 160 in communication with the cushion 33. The probe 160 has a flexible connection to allow free movement of the wall part 37 which it penetrates to gain access to the cushion 33. The chambers 46 are fed with pressurised air through ducts 59 connected to the duct 40. The duct 40 and hence the ducts 59 are supplied with air from an air compressor 60 having an atmospheric air-intake 61. The compressor 60 is driven by a variable-speed motor 62, the speed of which is controlled through electrical signal lines 163, by the driver of the railcar 31.

In operation the railcar 31 is propelled along the track 32 by pairs of linear motors (not shown, but similar to the linear motors 20 of FIGURE 4) and which cooperate with "rotors" or rails 32a attached to the upper side faces of the track 32. As stated above, the vehicle is supported by the air cushions 33 and stabilised by air cushions 35. For optimum stability a substantially fixed ratio is maintained between the forces exerted on the support and guide surfaces of the track 32 by the cushions 33 and 35. The actual ratio depends on the geometry of the track section but for the arrangement illustrated, wherein the support and guide surfaces have a substantially 3:4 ratio of area, the forces exerted on the track 32 by the support and stability cushions are in the order of 2:1 respectively. To maintain this ratio a change in pressure of a cushion 33 is sensed by the controller 58 and this results in the controller adjusting the loading of the springs 54, through the spindles 55 and motors 56, which in turn results in the extension or retraction of the walls 47 of the chambers 46. Movement of the walls 47 adjust, in turn, the track side or guide surface to wall clearances filled by the cushions 35 so that the cushion pressures are increased or decreased. This varies the forces exerted by the cushions on the track guide surfaces.

FIGURE 7 illustrates a further form of railcar vehicle. The railcar 61 is propelled by wheels (not shown) along a concrete track 62 of channel section and is supported thereover by a series of air cushions 63 disposed in tandem along the fore-to-aft axis of the railcar body 64. The railcar is stabilised by pairs of air cushions 65 also disposed in tandem but substantially parallel to said fore-to-aft axis, one air cushion 65 of a pair being in contact with one side face of the track 62 and the other of the pair being in contact with the oppositely-facing (in an inward sense) side face thereof. The propulsion wheels are rotated on substantially vertical axes so that the wheels engage with said inner faces of the track 62. The air cushions 63 are associated with chambers 66 having components 67 to 73 similar to components 47 to 53 respectively, of FIGURE 6. The air cushions 65 are associated with chambers 76 having components 77 to 83 similar to components 47 to 53 respectively, of FIGURE 6. The chambers 66 and 76 are mounted on a bogie 88 and the bogie carries an air compressor 89 with an atmospheric air-intake 90. The compressor supplies pressurised air to the chambers 66, 76 through flexible ducts 91, 92. If required, the arrangement can be modified in the manner suggested by the embodiment of FIGURE 7 so as to maintain a substantially constant support/stability cushion force ratio between the cushions 63, 65. The bogie 88 and railcar body 74 are provided with cooperating load and alignment bearings 93, 94. Bogie mounting of the compressor 89 and associated components avoids undue stressing of the railcar body 74, allows rapid replacement of the unit formed by the compressor and said components and, by isolation from the railcar body, substantially reduces the transfer of noise and vibration to the body. Bogie-mounting is also advantageous for low speed manoeuverability and for operation on tracks with curves of small radius.

FIGURE 8 illustrates a modification of the arrangement illustrated in FIGURES 2 and 3, although the same modification can also be made to the arrangements of FIGURES 4 to 7. With reference to FIGURE 8, the air cushion 2 is contained by a flexible wall means in the form of a skirt 100 which depends from and extends (in this example) around the whole of the periphery of the wall part 4. The skirt 100 is of the form disclosed by co-pending British application 11,645/62, comprising a plurality of flexible, contiguous wall members 101 each of which is formed from a sheet of flexible material folded to define an outer, cushion-facing portion 102 and two side or tie portions 103 constraining the outer portion 102 to resist outward deflection by pressure of the cushion 2. The cushion is formed by allowing air to flow outwardly from the interior of the chamber 3 by way of air transfer ports in the form of apertures 104 penetrating the centre of the wall part 4 to connect the interior of the chamber 4 with the space occupied by the cushion 2. The cushion 2 is contained by the skirt 100 in a "plenum-chamber" manner, air surplus to cushion requirements escaping to atmosphere by way of a small peripheral gap 105 between the bottom of the skirt 100 and the adjacent surface of the track.

With reference to FIGURE 9, the flexible wall means containing the cushion 2 could, alternatively, take the form of a gas-directing nozzle 110 of flexible construction attached to and extending (in this example) wholly around the periphery of the wall part 4 and depending therefrom. The nozzle 110 is of rubber and is of substantially U-like vertical cross-section, one upper edge being attached to the wall part 4 by a ring of spaced bolts 111 and the other upper edge being attached to the membrane 7 by the upper ends of a series of spaced radius arms 112 pivotally attached to the periphery of the wall part 4 at 113. Anti-fretting washers 114 reduce wear caused by relative movement between the diaphragm 7 and nozzle 110. The arms 112 control movement of the nozzle 110 relative to the wall part 4.

The nozzle 110 is of two part construction, each of the two parts forming half of the nozzle passageway 115 and being held together by demountable connections in the form of screwed pins 116. The nozzle passageway is maintained by a series of spacers 117 of fibre material held in position by the pins 116 which pass through locating holes drilled through the spacers. Under normal operating conditions, the discharge end of the nozzle passageway 115 is spaced from the track surface 6 by a very small (e.g. .0125") gap 118. Because the gap 118, which is closed by the air curtains 14, is small, the nozzle material immediately adjacent the discharge end of the nozzle passageway 115 is thickened locally so that a substantial amount of abrasive wear caused by occasional, though inevitable, contact between the nozzle and track surface can be tolerated. When, however, the wear becomes too great the nozzle 110 is detached from the diaphragm 7 and wall part 4 and replaced by another nozzle.

We claim:
1. A vehicle which obtains at least occasional support from a custion of pressurised gas formed and contained between the vehicle body and the surface over which the vehicle operates, provided with a chamber having a movable wall part which faces the surface, the wall part being flexibly connected to the remainder of the chamber so as to be movable towards and away from the surface, gas supply means for supplying pressurised gas to the chamber interior, cushion-forming means for directing gas from the chamber to between the wall part and the surface so as to form said cushion of gas therebetween and resilient means for biasing the wall part away from the surface against the loading of gas in the chamber.

2. A vehicle for operation on a track defining a support surface and a pair of oppositely-facing guide surfaces wherein the vehicle is supported, at least in part, by a cushion of pressurised gas formed and contained between the vehicle body and the track support surface, the vehicle being provided with a chamber having a movable wall part which faces the support surface, the wall part being flexibly connected to the remainder of the chamber so as to be movable towards and away from the support surface, gas supply means for supplying pressurised gas to the chamber interior, cushion-forming means for directing gas from the chamber to between the wall part and the support surface so as to form said cushion of gas therebetween, resilient tie means for biasing the wall part away from the surface against the loading of gas in the chamber and vehicle stabilising means including means for forming a pair of gas-cushions in contact with the track guide surfaces, the vehicle also being provided with control means for maintaining a differential between the forces exerted by the vehicle supporting gas cushion and the vehicle stabilising gas cushions on the track support and guide surfaces respectively.

3. A vehicle as claimed in claim 2 wherein the control means comprise means sensitive to the pressure of the vehicle-supporting cushion for varying the loading of the resilient tie means.

4. A vehicle as claimed in claim 3 wherein the resilient means comprise tension spring means connecting the wall part and a member movable relative to the chamber whereby movement of the member varies the loading of the tension spring means.

5. A vehicle as claimed in claim 2 wherein the guide surfaces face outwardly towards each other.

6. A vehicle as claimed in claim 2 wherein the guide surfaces face inwardly towards each other.

7. A vehicle as claimed in claim 2 wherein the chamber and the vehicle-stabilising means are mounted on a bogie detachably connected to the vehicle body.

8. A vehicle as claimed in claim 1 wherein the cushion-forming means include a gas discharge port for directing a flow of pressurised gas from the chamber and towards the surface in the form of at least one curtain of moving gas.

9. A vehicle as claimed in claim 1 wherein the cushion-forming means include a gas transfer port connecting the interior of the chamber with the space occupied by the cushion and flexible wall means extending around and depending from at least part of the periphery of the wall part.

10. A vehicle as claimed in claim 1 wherein the wall part is connected to the remainder of the chamber by a rolling diaphragm of flexible material whereby the connection has substantially no stiffness over the middle part of its travel.

References Cited

UNITED STATES PATENTS

| | | | |
|---|---|---|---|
| 3,096,728 | 7/1963 | Amann | 104—23 |
| 3,164,103 | 1/1965 | Lathers | 104—23 |
| 3,168,875 | 2/1965 | Reed | 104—134 |

ARTHUR L. LA POINT, *Primary Examiner.*

D. F. WORTH, *Assistant Examiner.*